United States Patent
Gustafsson et al.

(10) Patent No.: US 6,571,827 B1
(45) Date of Patent: Jun. 3, 2003

(54) DEVICE FOR A CONTAINER

(75) Inventors: Marie-Louise Gustafsson, Stockholm (SE); Torbjörn Petterson, Gnesta (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 09/936,662
(22) PCT Filed: Mar. 17, 2000
(86) PCT No.: PCT/SE00/00521
§ 371 (c)(1), (2), (4) Date: Sep. 14, 2001
(87) PCT Pub. No.: WO00/56138
PCT Pub. Date: Sep. 28, 2000

(30) Foreign Application Priority Data

Mar. 19, 1999 (SE) .............................................. 9901006

(51) Int. Cl.⁷ ........................... F16K 11/048; A01J 5/04
(52) U.S. Cl. ................................ 137/625.27; 119/14.55
(58) Field of Search ..................... 137/625.26, 625.27; 119/14.51, 14.55, 14.54

(56) References Cited

U.S. PATENT DOCUMENTS

| | | | | |
|---|---|---|---|---|
| 2,425,873 A | * | 8/1947 | Gessler .................... | 119/14.55 |
| 2,564,686 A | * | 8/1951 | Gray ...................... | 137/625.26 |
| 2,694,380 A | * | 11/1954 | Harstick .................. | 119/14.55 |
| 2,896,573 A | * | 7/1959 | Schalm et al. ............ | 119/14.55 |
| 2,922,394 A | * | 1/1960 | Jansson .................... | 119/14.55 |
| 3,014,455 A | * | 12/1961 | Olander .................... | 119/14.55 |
| 3,187,770 A | * | 6/1965 | Plamann .................. | 137/625.26 |
| 3,741,161 A | * | 6/1973 | Zhuk et al. .............. | 119/14.55 |
| 4,023,588 A | * | 5/1977 | Olander .................. | 137/625.27 |
| 4,395,971 A | | 8/1983 | Happel et al. ........... | 119/14.36 |
| 5,988,105 A | * | 11/1999 | Sandgren ................. | 119/14.54 |
| 6,006,695 A | * | 12/1999 | Gustafsson .............. | 119/14.54 |

FOREIGN PATENT DOCUMENTS

| | | |
|---|---|---|
| SE | 212649 | 5/1967 |
| WO | WO97/27738 | 8/1997 |

* cited by examiner

*Primary Examiner*—John Rivell
(74) *Attorney, Agent, or Firm*—Hovey Williams LLP

(57) ABSTRACT

The application discloses a device for a container which includes a casing (1) which defines an inner space (2), which extends from the inner space and is connectable to a vacuum source in order to reduce the pressure in the inner space and the outlet space to be lower than the pressure of a surrounding space. The device includes a valve arrangement (8) with a valve seat (9), which forms a first passage (6) between the inner space and the outlet space, a valve element (10), which is abuttable against the valve seat for closing the first passage in the first position and is displaceable from the valve seat for opening the passage, and a spindle portion (11) which is connected to the valve element and extends through the valve seat, the outlet space and a second passage (12) through the casing. Means (18, 19) are arranged to form a flow passage, which in the first position of the valve arrangement permits a flow from the surrounding space to the inner space.

20 Claims, 1 Drawing Sheet

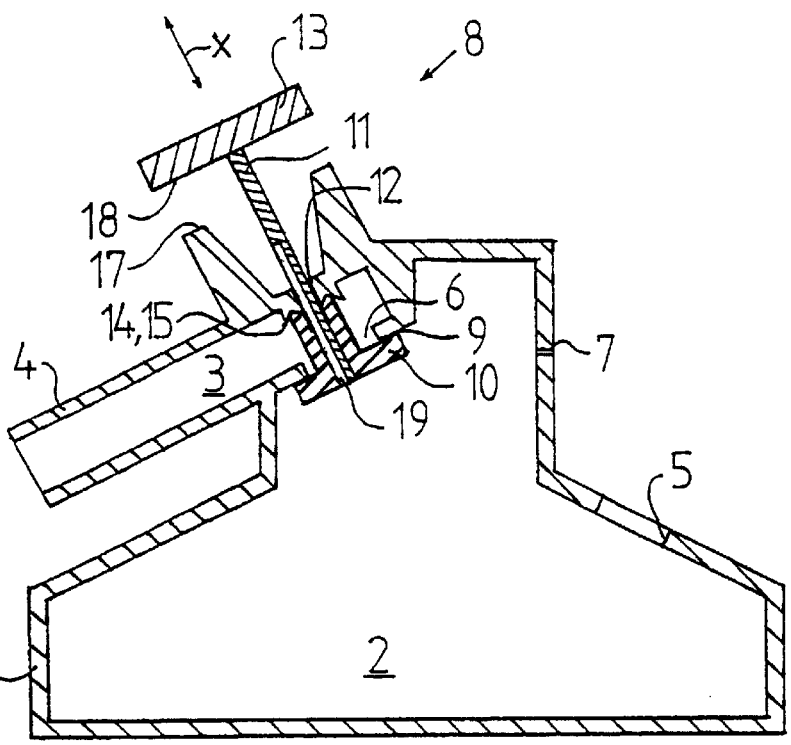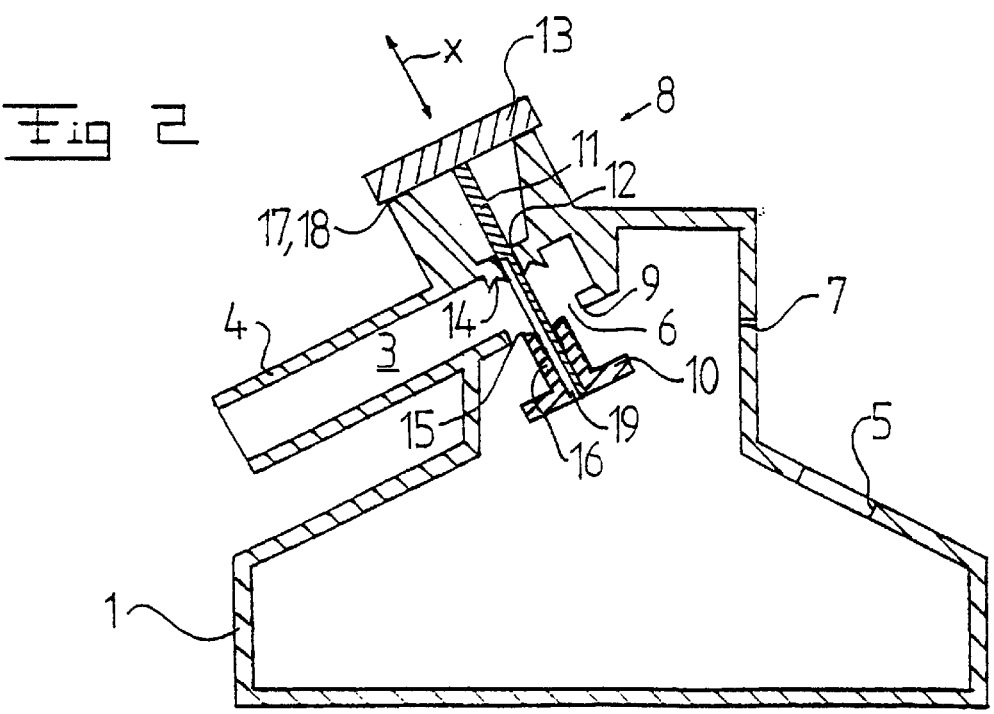

DEVICE FOR A CONTAINER

BACKGROUND OF THE INVENTION

1. Field of the Invention

The present invention refers to a device for a container which includes a casing defining an inner space and an outlet space, which extends from the inner space and is arranged to be connected to a vacuum source in such a manner that the pressure in the inner space and the outlet space in a state of use is less than the pressure of a surrounding space outside the casing, wherein the device includes a valve arrangement which includes

- a first valve seat, which forms a first passage between the inner space and the outlet space,
- a first valve element, which is abuttable against the first valve seat for closing the first passage in a first position of the valve arrangement and which is displaceable from the first valve seat to a second position of the valve arrangement for opening the first passage, and
- a spindle portion which is connected to the first valve element and extends through the first valve seat, the outlet space and a second passage through the casing.

2. Description of the Prior Art

It is known to use such devices for claws, which includes an outlet pipe connected to a vacuum source and arranged to transport milk from the inner space of the claw to an collecting member of a milking machine. Furthermore, such claws include inlet members, which are arranged to permit the supply of milk from a respective teatcup via a short milk conduit or a teatcup liner. During milking there is a subpressure in the inner space and in the milk conduits. Certain milking machines offer the possibility to detach the teatcups from the teats automatically, wherein the subpressure in the inner space of the claws and the conduits is removed before the detachment takes place. Since the pressure then will be substantially equal in the inner space of the claw and in the surrounding space, the teatcups will fall off the teats. However, many milking machines do not have any such automatic detachment of the teatcups. The low pressure level in the interior of the claw is thus maintained after the milking is terminated. One such known claw, see for instance WO97/27738, includes a closing valve by which a passage between the inner space of the claw and an outlet space in the outlet pipe may be closed in such a way that no milk flow may flow from the inner space of the claw through the long milk conduit any longer. Furthermore, the low pressure level in the inner space of the claw will increase slowly thanks to an air inlet which permits a certain air inflow from the surrounding space to the inner space of the claw.

However, this air inlet has in the first place another purpose, namely to facilitate the removal of the milk from the inner space of the claw to said collecting member, and therefore has very small dimensions, which means that the pressure between the surrounding space and inner space will be equalised very slowly. Due to this slow pressure equalisation it will take a long time before the teatcups may be detached in an easy manner from the teats.

SUMMARY OF THE INVENTION

The object of the present invention is to remove the problems mentioned above and to provide a device by which the detachment of the teatcups from the teats may be facilitated. In particular, it is aimed at a device by which the pressure between the surrounding space and the inner space of a container, which in a state of use has a very low pressure, may be equalized when the inner space of the container is closed from the pressure reducing source.

This object is obtained by the device initially defined, which is characterized by means which are arranged to form a flow passage which, in the first position of the valve arrangement, permits a flow from the surrounding space to the inner space. By the provision of such a flow passage the pressure in the inner space of the container and the surrounding space will be equalized in a substantially more quick manner than by the technique known up to now. Advantageously, such means are arranged to prevent a flow through the flow passage in the second position of the valve arrangement. In such a way, the flow passage according to the invention will not give rise to any air inflow to the inner space of the container when the valve arrangement is in the open position. For instance, in the case of a claw it is obtained that no air is leaking into the claw during milking. Furthermore, the flow passage is advantageously formed by a channel, which is closed with regard to the outlet space.

According to an embodiment of the invention, the channel extends through the first valve element and the spindle portion. By positioning the channel in this way, the displacement of the valve arrangement between the first position and the second position may be utilized to open and close, respectively the flow passage. Furthermore, such a positioning of the channel requires a small space, which is advantageous with regard to claws.

According to a further embodiment of the invention, the valve arrangement includes a second valve seat, which surrounds the second passage, and a second valve element, which is arranged to abut the second valve seat in said first position for closing the second passage between the outlet space and the surrounding space and which is displaced from the second valve seat in said second position. By such a second valve element, air is prevented from leaking from the surrounding space into the outlet space when the first valve element is in the closed position. Advantageously, the channel has an orifice in the surrounding space at least when the valve arrangement is in the first position.

According to a further embodiment of the invention, the second valve element extends around the spindle portion. A body of a flexible material may be provided around the spindle portion and form the first valve element and the second valve element. Such a body, for instance of rubber, may in a relatively easy manner be brought to seal against both the first valve seat and the second valve seat. Furthermore, by such a common body for the valve elements the mounting of the valve arrangement is facilitated. Furthermore, the spindle portion may include a groove which extends along the spindle portion and which together with said body forms the channel. Such a groove may be manufactured in a relatively simple manner, wherein the channel is obtained in connection with the mounting of the valve arrangement.

According to a further embodiment of the invention, the spindle portion is connected to a manoeuvre member, which is located in the surrounding space and is arranged to permit manoeuvring of the valve arrangement at least from the first position to the second position. Thereby, the manoeuvring member may be arranged to form a third valve element, which is abuttable against a third valve seat which is located on the outer side of the casing and extends around the second passage, wherein the third valve element is arranged to close the second passage when the valve arrangement is in the second position in order to prevent a flow from the surrounding space to the outlet space. The orifice is preferably located on the spindle portion between the third valve element and the second valve element, i.e. a flow from the surrounding to the inner space is obtained first when the third valve element does not abut the third valve seat.

The invention is applicable to a container in the form of a claw, which is arranged to be connected to a milking machine via a milk conduit and an outlet space, and to a number of teatcups which are connected to the inner space via the inlet members extending through the casing.

BRIEF DESCRIPTION OF THE DRAWINGS

The present invention is now to be explained more closely by means of an embodiment, which is described as an example, and with reference to the drawing attached. In the drawing, FIG. 1 discloses schematically a section through a claw having a valve arrangement located in a closed position, and FIG. 2 a section along the claw in FIG. 1 with the valve arrangement in an open position.

DETAILED DESCRIPTION OF AN EMBODIMENT OF THE INVENTION

The invention is now to be explained by a description of a claw. However, it is to be noted that the invention also is applicable to other types of containers from which for instance a liquid is to be transported by means of a subpressure. For instance, the invention may be applicable to a teatcup which in a container space includes a valve arrangement of the type to be described more closely now.

With reference to FIGS. 1 and 2, a claw is disclosed, which includes a casing 1, which defines an inner space 2 and an outlet space 3. The part of the casing 1, which defines the outlet space 3, has the shape of an outlet pipe 4 which is arranged to be connected to a long milk conduit (not disclosed) which in its turn is connected to a vacuum source of a milking machine (not disclosed). Furthermore, the claw includes a number of inlet openings 5, which extend through the casing 1 and only one of which is disclosed in FIGS. 1 and 2. The inlet openings 5 are arranged to receive a short milk conduit or a teatcup liner (not disclosed) and in such a way connect the inner space 2 of a claw to a respective teatcup (not disclosed). The inner space 2 and the outlet space 3 are connected to each other via a first passage 6, which permits transport of milk from said teatcups through the inlet openings 5 to the inner space 2 and from there to the outlet space 3 and further to a milk collecting member of said milking machine. In order to facilitate transport, which is obtained in a conventional manner by means of said vacuum source, there is an air inlet 7 which extends through the casing 1. The air inlet 7 merely permits a very small air inflow to the inner space 2 and has a cross-sectional diameter which in a typical case is less than 1 mm.

In order to stop up the flow from the inner space 2 to the outlet space 3 a valve arrangement 8 is provided. The valve arrangement 8 includes a first valve seat 9, which extends around a first passage 6 between the inner space 2 and the outlet space 3, and a first valve element 10, which is abuttable against the first valve seat 9. When the first valve element 10 abuts the first valve seat 9, the valve arrangement 8 is in a first position disclosed in FIG. 1. In this first position the flow from the inner space 2 to the outlet space 3 is thus prevented. When the first valve element 10 is displaced from the first valve seat 9, the valve arrangement 8 is in a second position, which is disclosed in FIG. 2 and which permits a flow from the inner space 2 to the outlet space 3. The first valve element 10 is provided on a valve spindle 11, which extends through a second passage 12 extending through the casing 1. The valve spindle 11 is relatively closely held in the second passage 12 so that an annular gap is formed, and is thereby easily displaceable in its longitudinal direction x between the first position and the second position. The displacement of the valve arrangement 8 is obtained partly by means of the pressure relations which arises in different states of operation and partly by means of a manoeuvre member 13, which is provided in a surrounding space outside the casing 1 and which is attached to an outer end of the spindle 11.

The valve arrangement 8 also includes a second valve seat 14, which surrounds the second passage 12 and faces the outlet space 3, and a second valve element 15, which is abuttable against the second valve seat 14 in order to close the second passage 12 between the outlet space 3 and the surrounding space in such a way that no air can flow in from the surrounding space between the valve spindle 11 and the inner wall of the second passage 14. The first valve element 10 and the second valve element 15 are formed by a common body 16 which is provided on the valve spindle 11. Thereby, the body 16 includes a hole through which the valve spindle 11 extends. The body 16 is manufactured in a flexible material, preferably any rubber-like material. The body 16 is dimensioned in such a way that in the first closed position of the valve arrangement 8 the first valve element 10 will abut sealingly the first valve seat 9 at the same time as the second valve element 15 abuts sealingly the second valve seat 14. As is indicated in the figures, the body 16 is designed in such a way that the part of the body 16 which forms the second valve element 15 extends around the valve spindle 11 at a small distance from the valve spindle 11 in such a way that a thin, annular gap is formed between the valve spindle 11 and the body 16. The gap has a limited extension in the longitudinal direction x of the valve spindle 11. Thanks to this gap the second valve element 15 obtains a certain flexibility in a radial direction, which facilitates a sealing abutment against the second valve seat 14. As appears from in particular FIG. 2, the second valve seat 14 is designed as an annular depression extending around the second passage 12 and being arranged to receive the second, annular valve element 15.

Furthermore, the valve arrangement 8 includes a third valve seat 17, which is located on the outer side of the casing 1 and extends around the second passage 12. Also the manoeuvre member 13 is manufactured by a flexible material, for instance any rubber-like material, and arranged to form a third valve element 18, which is abuttable against the third valve seat 17. The third valve element 18 is arranged to abut the third valve seat 17 and thus close the second passage 12 when the valve arrangement 8 is in the second open position. In such a way the third valve element 18 will prevent a flow from the surrounding space to the outlet space 3 and the inner space 2. Air may thus not flow into the claw via the second passage 12 when the valve arrangement 8 is in the open position and consequently, permits transport of milk from the inner space 2 via the outlet space 3 to said milk collecting member.

According to the present invention, the valve arrangement 8 includes a flow passage, in the form of a channel 19 which permits a flow from the surrounding space to the inner space 2 when the valve arrangement 8 is in the closed position, which is disclosed in FIG. 1. According to the disclosed embodiment, the channel 19 extends through the valve spindle 11. More particularly, the channel 19 includes a groove which extends in the valve spindle 11 in its longitudinal direction x. Consequently, the channel 19 is formed by the groove in the valve spindle 11 and the above mentioned hole through the body 16. As appears from the figures, the channel 19 has an orifice which is located in the surrounding space when the valve arrangement 8 is positioned in this closed position and which is located in the second passage 12 when the valve arrangement 8 is positioned in the open position. The position of the orifice in the open position of the valve arrangement 8 is however not critical since the third valve element 18 abuts sealingly the third valve seat 17 in this open position and in such a way a flow from the surrounding space into the channel 19 is prevented.

The present invention is not limited to the embodiment disclosed but may be varied and modified within the scope of the following claims. It is to be noted, for instance, that the channel 19 may be formed by a hole extending through the valve spindle 11. It is also possible to provide the channel 19 in such a way that it extends through the casing 1, wherein it has an orifice towards the surrounding space, which orifice is located in such a way that it may not be reached by a flow from the surrounding space when the third valve element 18 abuts the third valve seat 17.

What is claimed is:

1. A device for a container comprising:
    a casing defining an inner space and an outlet space which extends from the inner space and is arranged to be connected to a vacuum source in such a manner that the pressure in the inner space and the outlet space in a state of use is less than the pressure of a surrounding space outside the casing;
    a valve arrangement including
        a first valve seat which forms a first passage between the inner space and the outlet space,
        a first valve element which is abuttable against the first valve seat for closing the first passage in a first position of the valve arrangement and which is displaceable from the first valve seat to a second position of the valve arrangement for opening the first passage,
        a spindle portion which is connected to the first valve element and extends through the first valve seat, the outlet space and a second passage through the casing,
        means which arranged to form a flow passage which, in the first position of the valve arrangement, permits a flow from the surrounding space to the inner space,
        a second valve seat which surrounds the second passage, and
        a second valve element which is arranged to abut the second valve seat in said first position in order to close the second passage between the outlet space and which is displaced from the second valve seat in said second position.

2. A device according to claim 1, wherein said means are arranged to prevent a flow through the flow passage in the second position of the valve arrangement.

3. A device according to claim 1, wherein the flow passage is formed by a channel which is closed with regard to the outlet space.

4. A device according to claim 3, wherein the channel extends through the first valve element and the spindle portion.

5. A device according to claim 4, wherein the channel has an orifice in the surrounding space at least when the valve arrangement is in the first position.

6. A device according to claim 1, wherein the second valve element extends around the spindle portion.

7. A device according to claim 6, wherein the first valve element and the second valve element are formed by a body of a flexible material which is provided around the spindle portion.

8. A device according to claim 7, wherein the spindle portion includes a groove which extends along the spindle portion and which together with said body form a channel which is closed with regard to the outlet space.

9. A device according to claim 1, including a manoeuvre member, wherein the spindle portion is connected to the manoeuvre member which is located in the surrounding space and arranged to permit manoeuvring of the valve arrangement at least from the first position to the second position.

10. A device according to claim 9, wherein the casing has an outer side and the manoeuvre member is arranged to form a third valve element which is abuttable to a third valve seat located on the outer side of the casing and extending around the second passage, wherein the third valve element is arranged to close the second passage when the valve arrangement is located in the second position in order to prevent a flow from the surrounding space to the outlet space.

11. A device according to claim 10, including an orifice in the surrounding space at least when the valve arrangement is in the first position, and wherein the orifice is located on the spindle portion between the third valve element and the second valve element.

12. A device according to claim 1, wherein the container is a claw.

13. A device according to claim 2, wherein the flow passage is formed by a channel which is closed with regard to the outlet space.

14. A device according to claim 2, wherein the second valve element extends around the spindle portion.

15. A device according to claim 3, wherein the second valve element extends around the spindle portion.

16. A device according to claim 2, wherein the spindle portion is connected to a manoeuvre member which is located in the surrounding space and arranged to permit manoeuvring of the valve arrangement at least from the first position to the second position.

17. A device according to claim 6, wherein the spindle portion is connected to a manoeuvre member which is located in the surrounding space and arranged to permit manoeuvring of the valve arrangement at least from the first position to the second position.

18. A device according to claim 8, wherein the spindle portion is connected to a manoeuvre member which is located in the surrounding space and arranged to permit manoeuvring of the valve arrangement at least from the first position to the second position.

19. A device according to claim 6, wherein the container is a claw.

20. A device according to claim 9, wherein the container is a claw.

* * * * *